June 30, 1942.　　　I. F. WARD　　　2,288,258
HOT AIR HEATING PLANT
Filed Oct. 29, 1940　　　4 Sheets-Sheet 4
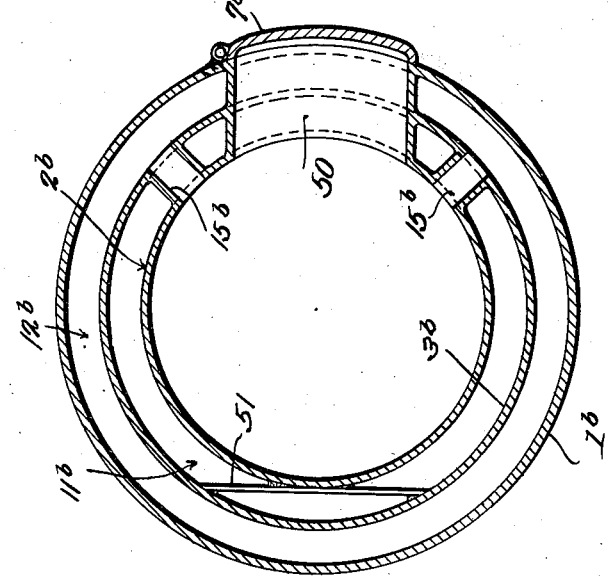
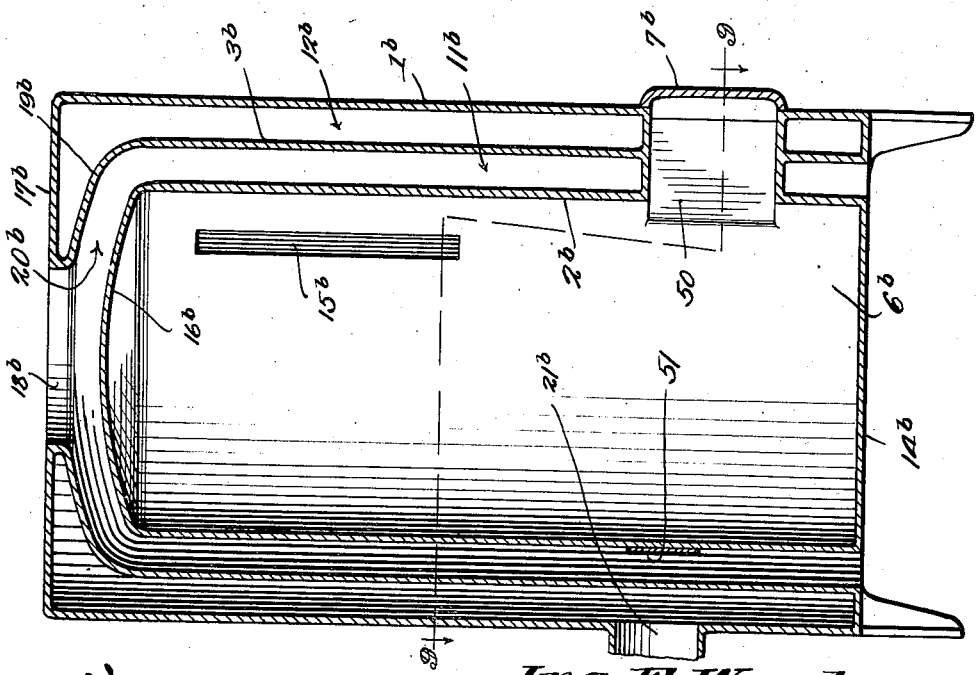
*Ira F. Ward* INVENTOR.
BY *[signature]*
ATTORNEYS.

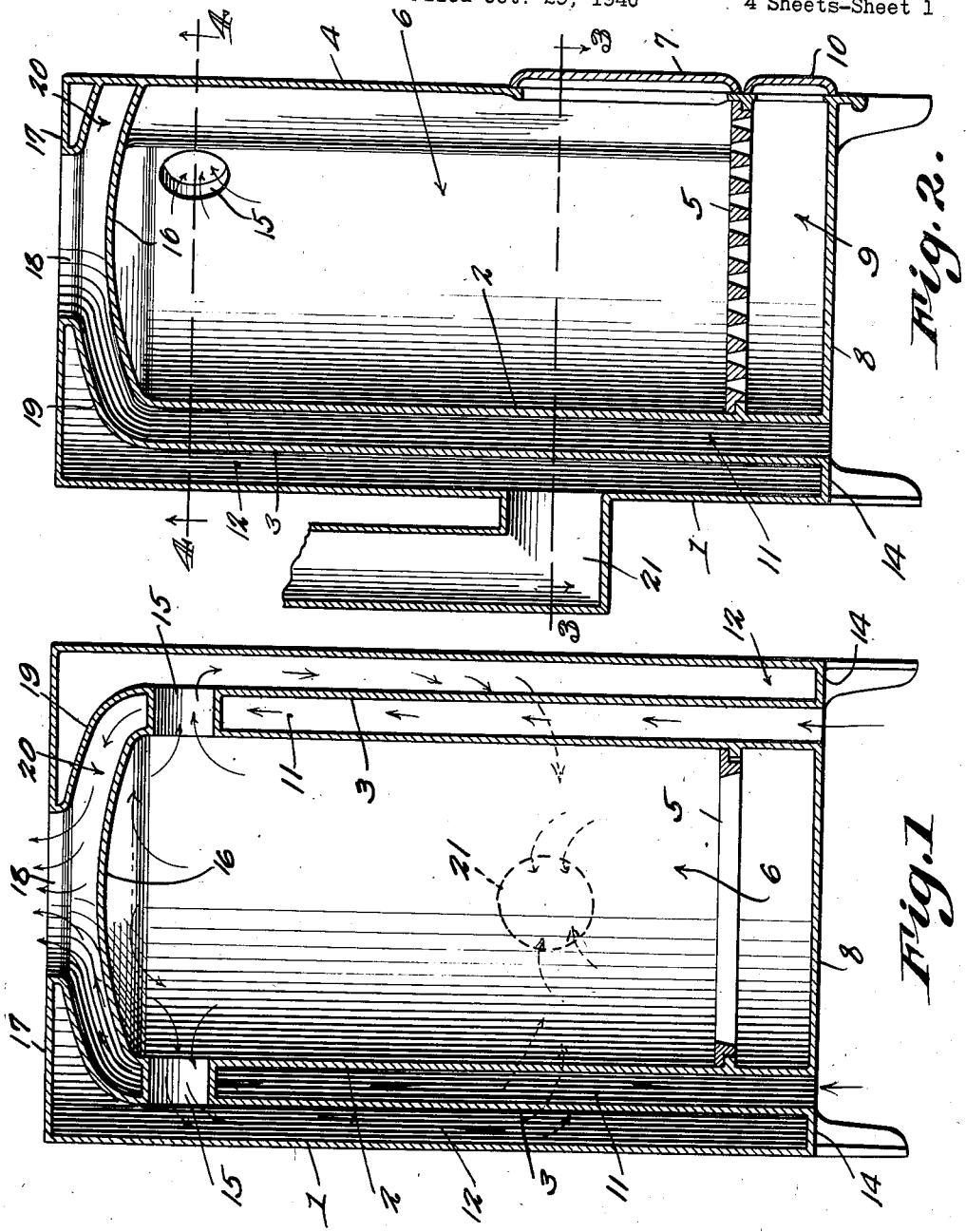

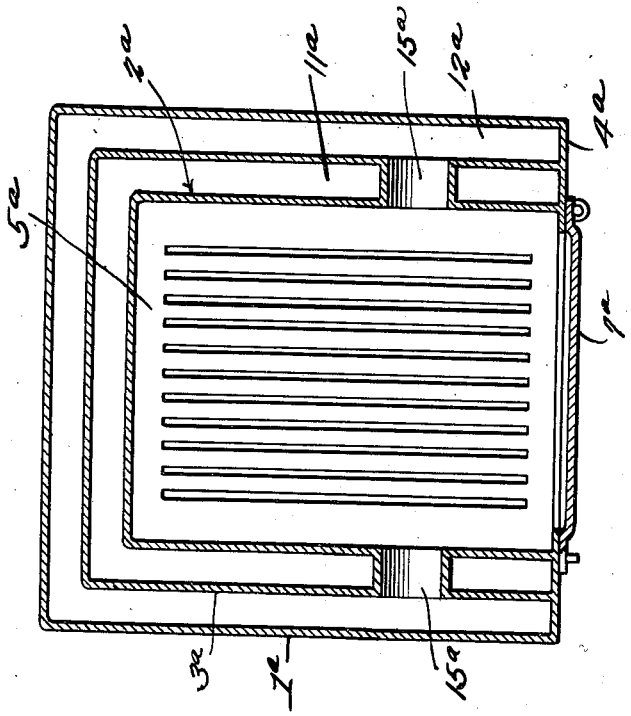
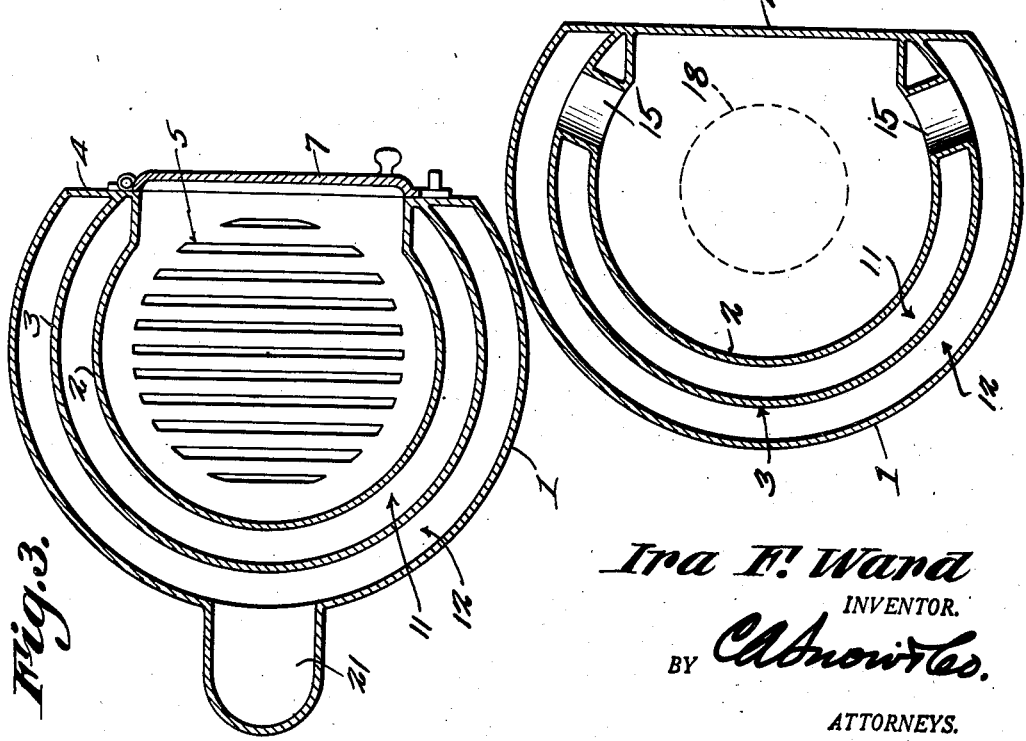

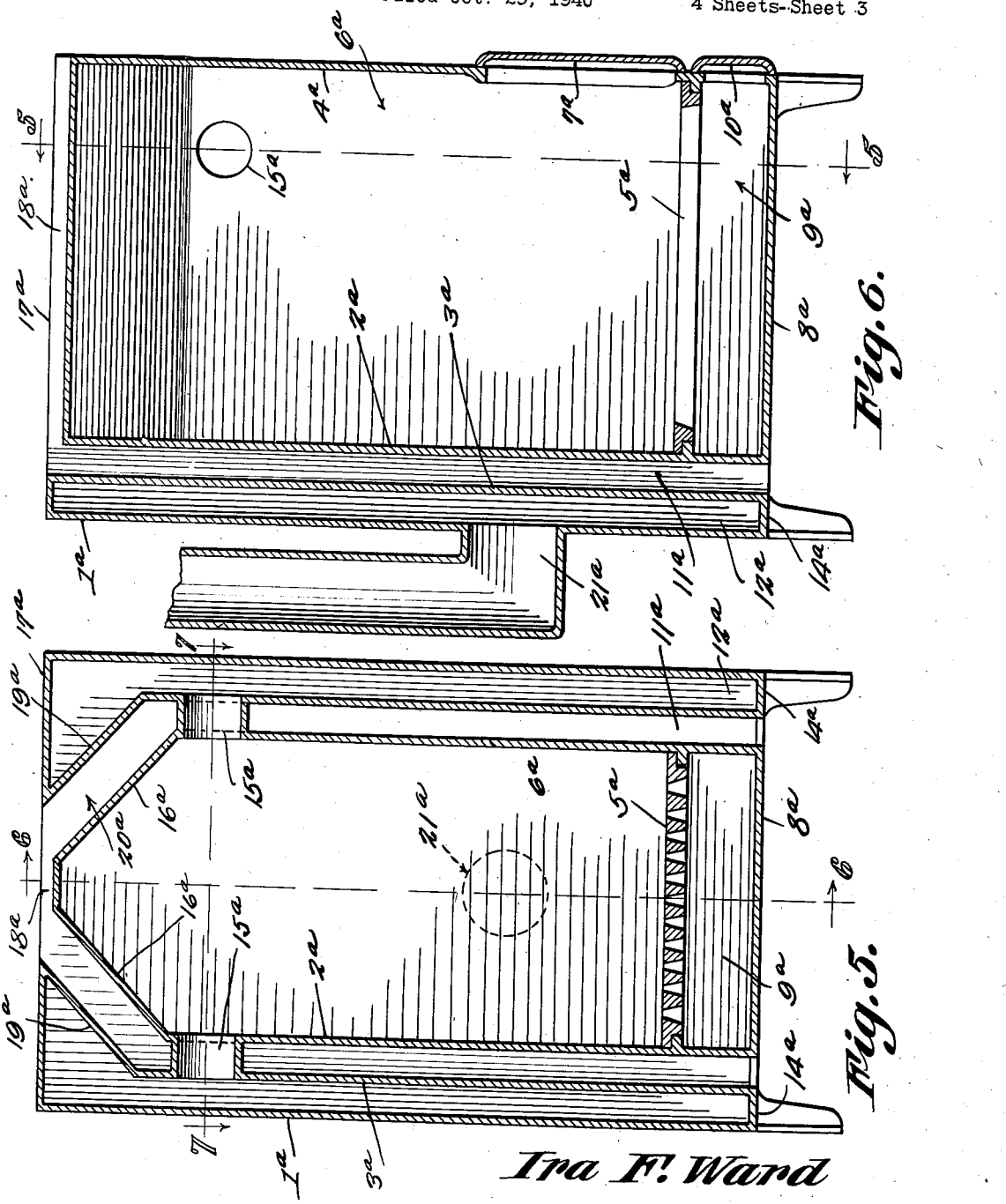

Patented June 30, 1942

2,288,258

UNITED STATES PATENT OFFICE 2,288,258

HOT AIR HEATING PLANT

Ira F. Ward, Golden, Colo.

Application October 29, 1940, Serial No. 363,372

1 Claim. (Cl. 126—67)

The objects of this invention are to provide a novel and efficient heating plant whereby the products of combustion, which are wasted in the ordinary heating plant, may be utilized adequately, fuel costs being reduced. Another object of the invention is to provide means whereby a room may be rapidly and healthfully heated, without over-burning the air in the room, a proper circulation being afforded, the air passing rapidly through the heating plant, and being quickly warmed and circulated through the medium of air-swept portions of the plant. A further object of the invention is to provide a device of the class described, wherein the heating plant will be relieved readily and rapidly of its heat, the danger of conflagration being avoided, and the effective life of the plant being increased. A further object of the invention is to provide means whereby the device may heat effectively and satisfactorily by radiation and by circulation.

With the above and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings:

Fig. 1 shows in longitudinal vertical section, a heating plant constructed in accordance with the invention;

Fig. 2 is a longitudinal vertical section taken on a cutting plane at right angles to that of Fig. 1;

Figs. 3 and 4 are sections taken, respectively, on the lines 3—3 and 4—4 of Fig. 2;

Fig. 5 is a longitudinal vertical section showing a modified form of the invention, on the line 5—5 of Fig. 6;

Figs. 6 and 7 are sections taken, respectively, on the lines 6—6 and 7—7 of Fig. 5.

Fig. 8 is a vertical section showing another modification;

Fig. 9 is a cross section on the line 9—9 of Fig. 8.

In this application, the word "heater" is to be taken as including a stove, furnace, or any analogous structure.

Referring to Figs. 1 to 4, the heater is shown as comprising a body or outer wall 1, closed at its upper end by a top 17, supplied with an outlet 18. The outer wall 1 and the top 17 form a unit. The outer wall 1 and the top 17 throw off heat by radiation. Within the body 1 is disposed an intermediate wall 3, closed at its upper end by a ceiling 19, of upwardly convex construction. The intermediate wall 3 and the ceiling 19 form a unit. Within the intermediate wall 3 is disposed an inner wall 2, closed at its upper end by an upwardly convex ceiling 16. The inner wall 2 and the ceiling 16 form a unit.

Throughout the major portion of their extent, as to cross section, the outer wall 1, the inner wall 2 and the intermediate wall 3 are of cylindrical form, but at the forward side of the heater, the outer wall, the intermediate wall and the inner wall are joined to a front 4, which may be flat. The heating means may be of any desired sort. As shown, but not of necessity, it comprises a grate 5 within the inner wall 2, near the lower end thereof. Above the grate 5 is located an inner combustion chamber 6. Access is had to the inner combustion chamber 6 by a stoking door 7 on the front 4. The inner wall 2 has a bottom 8. The bottom 8 and the grate 5 form an ash pit 9, to which access is had by way of a cleanout door 10 on the front 4.

Between the inner wall 2 and the intermediate wall 3 there exists an updraft space 11 in which air is heated. The updraft air space 11 is open at its lower end. Between the intermediate wall 3 and the outer wall 1 there is an outer combustion chamber 12. The outer combustion chamber 12 is closed by a bottom 14 connecting the lower end of the intermediate wall 3 with the lower end of the outer wall 1. The products of combustion pass from the inner combustion chamber 6 into the outer combustion chamber 12 by way of thimbles 15 connected to the inner wall 2 and the intermediate wall 3, and extended across the updraft air space 11. The thimbles 15 may be located adjacent to the front 4 of the heater and near the lower edge of the upwardly convexed ceiling 16, which closes the inner combustion chamber 6 at its top.

The updraft air space 11 extends as shown at 20 between the ceilings 16 and 19, but the spaces 11 and 20 in fact form but one space, extended from the bottom of the heater to the top thereof. The spaces 11 and 20 form a continuous conduit angling at the top from the circumference toward the center in an upward direction. The same observation is true respecting the outer combustion chamber 12. Intermediate its ends, and nearer to the lower end of the heater than to the upper end thereof, the outer downdraft combustion space 12 has an outlet 21 for the products of combustion, which may be a pipe or stack.

The products of combustion, proceeding from the inner combustion chamber 6, pass by way of the thimbles 15 into the downdraft outer combustion chamber 12 and find an exit through the outlet 21. The outer downdraft combustion chamber 12 extends over the ceiling 19, as shown in Figs. 1 and 2, and consequently there is some circulation of the products of combustion, above the ceiling 19, to heat the air as it moves through the space 11—20 to the opening 18, and to accomplish other objects hereinafter set forth. Cold air enters the bottom of the updraft space 11 and leaves by way of the outlet member 18. The inner side of the ascending body of air is heated from the inner wall 2—16, and the ascending body of air is heated externally by the intermediate wall 3—19. The outer wall 1—17 also is heated from the outer combustion chamber 12.

It has been stated hereinbefore that the outer wall 1—17 throws off heat by radiation. The inner wall 2—16 and the intermediate wall 3—19 heat by circulation. The entire surfaces of the walls 3—19 and 2—16 are swept by the current of air as it passes upwardly through the space 11—20. The air-swept ceilings 16 and 19 constitute a very important feature. The current of air ascending through the outlet 18 in the middle of the top 17 creates a suction from the sides to the center of the top 17 which also sweeps the heat from its outer surface. This is important, as otherwise heat is held by stagnation, as in the top of the ordinary stove.

Heat in the inner combustion chamber 6 is extracted by the wall 2—16, and heat in the outer combustion chamber 12 is extracted by both walls 1—17 and 3—19. The outer chamber 12 is spacious sufficiently to allow the products of combustion, in their course from the conduits 15 to the outlet 21, to travel slowly enough to permit a pooling of heat in the upper portion of the outer combustion chamber 12, and thus the entire surfaces of walls 1—17 and 3—19 are heated.

In Figs. 5, 6 and 7, parts hereinbefore described have been designated by numerals already used, with the suffix *a*. In this form of the invention, the heater is of rectangular cross section. The ceilings 16*a* and 19*a* are flat, instead of being convexed.

In Figs. 8 and 9, parts hereinbefore described have been designated by numerals already used, with the suffix *b*. This form is useful when the device is equipped with an automatic stoker or with a burner for gas or oil fuel consumption.

The door 7*b*, corresponding to the door 7 of Fig. 2, is small. The inner wall 2*b*, the intermediate wall 3*b* and the updraft air space 11*b* extend completely across the front of the heater. A sleeve 50 leads from the combustion chamber 6*b* to the door 7*b*. The thimbles 15*b* are elongated vertically. The intermediate portion of a brace 51, in the updraft air space 11*b*, is secured to the inner wall 2*b*, the ends of the brace being secured to the intermediate wall 3*b*.

Having thus described the invention, what is claimed is:

A heater of the class described, comprising a body or outer wall encasing the combustion chamber, and a horizontally circuitous air flue within the combustion chamber, the air flue being defined by inner and outer walls extending from bottom to top of the combustion chamber and being spaced apart throughout their entire surface area, the air flue and its defining walls surrounding the firebox or burner in the bottom of the combustion chamber and converging upwardly over the firebox to the center of the top of the outer or body wall of the heater, the air flue having a cold air inlet at its lowermost extremity encircling the firebox and a hot air outlet at its uppermost extremity in the center of the top of the heater, the inner air-flue wall being imperforate in its top and the outer air-flue wall having an opening in its top in conjunction with an opening in the top of the heater body, the opening being the outlet for the air-flue, the combustion chamber being divided by the air-flue into inner and outer portions, there being egress means for the products of combustion to pass through the air-flue from the inner to the outer portions of the combustion chamber, there being an outlet for the products of combustion low in the body wall of the heater, both inner and outer air-flue walls throwing off heat by circulation and the body of the heater throwing off heat by radiation.

IRA F. WARD.